(12) United States Patent
Li

(10) Patent No.: US 12,034,670 B2
(45) Date of Patent: Jul. 9, 2024

(54) METHOD FOR FEEDING BACK DATA, METHOD FOR TRANSMITTING DATA AND USER EQUIPMENT

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 381 days.

(21) Appl. No.: 17/601,675

(22) PCT Filed: Apr. 9, 2019

(86) PCT No.: PCT/CN2019/081949
§ 371 (c)(1),
(2) Date: Oct. 5, 2021

(87) PCT Pub. No.: WO2020/206613
PCT Pub. Date: Oct. 15, 2020

(65) Prior Publication Data
US 2022/0216971 A1 Jul. 7, 2022

(51) Int. Cl.
*H04L 5/00* (2006.01)
*H04L 1/08* (2006.01)
*H04W 72/23* (2023.01)

(52) U.S. Cl.
CPC .............. *H04L 5/0053* (2013.01); *H04L 1/08* (2013.01); *H04W 72/23* (2023.01)

(58) Field of Classification Search
CPC ... H04L 5/0094; H04L 1/1861; H04L 5/0055; H04L 1/08; H04L 5/0044; H04L 5/0005; H04L 1/1864; H04L 5/0053; H04W 72/23
See application file for complete search history.

(56) References Cited

U.S. PATENT DOCUMENTS

2015/0305059 A1* 10/2015 Li .................... H04L 1/1812
370/329
2016/0219545 A1* 7/2016 Zhang .................... H04L 1/1848
(Continued)

FOREIGN PATENT DOCUMENTS

| CN | 107528676 A | 12/2017 |
|---|---|---|
| EP | 3439356 A1 | 2/2019 |
| EP | 3917241 A1 | 12/2021 |

OTHER PUBLICATIONS

PCT/CN2019/081949 English translation of the International Search Report dated Jan. 10, 2020, 2 pages.
(Continued)

*Primary Examiner* — Chi Ho A Lee
(74) *Attorney, Agent, or Firm* — Cozen O'Connor

(57) ABSTRACT

A method for using a control channel for providing feedback information to a user equipment (UE) from a base station, a method for transmitting data and a user equipment are disclosed. The method for feeding back data includes configuring a control channel for a UE, in which the control channel is configured to bear feedback information of physical uplink shared channel (PUSCH) data, the PUSCH data is sent by the UE and transmitting the feedback information to the UE via the control channel. The method for transmitting data includes: receiving feedback information of physical uplink shared channel PUSCH data sent by a base station via a control channel; and determining whether to retransmit the PUSCH data based on the feedback information.

11 Claims, 7 Drawing Sheets configuring a control channel for a user equipment UE — S101 sending the feedback information to the UE via the control channel — S102

(56) References Cited

U.S. PATENT DOCUMENTS

| | | | | |
|---|---|---|---|---|
| 2018/0034608 A1* | 2/2018 | Seo | ......................... | H04B 7/00 |
| 2018/0279274 A1* | 9/2018 | Sun | ..................... | H04W 52/367 |
| 2021/0037516 A1* | 2/2021 | Lyu | ....................... | H04L 1/1864 |
| 2021/0168849 A1* | 6/2021 | Oh | ........................ | H04W 72/23 |
| 2021/0297199 A1* | 9/2021 | Miao | ..................... | H04L 5/0048 |
| 2022/0038997 A1* | 2/2022 | Höglund | ............... | H04W 48/06 |
| 2022/0158800 A1* | 5/2022 | Jiao | ....................... | H04L 1/1854 |
| 2022/0341280 A1* | 10/2022 | Holderman | ......... | E21B 33/1208 |

OTHER PUBLICATIONS

Zte et al., Discussion on Configured Grant for NR-U, 3GPP TSG RAN WG1 Meeting #96bis, Mar. 30, 2019, 7 pages.
European Patent Application No. 19924101.9 Search and Opinion dated Mar. 25, 2022, 10 pages.
Ericsson "Uplink HARQ-ACK feedback for MTC" 3GPP TSG-RAN WG2 #99, R2-1708632; Aug. 2017; 4 pages.
Indian Patent Application No. 202147050533 Office Action dated Jun. 1, 2022, 7 pages.

* cited by examiner

US 12,034,670 B2

METHOD FOR FEEDING BACK DATA, METHOD FOR TRANSMITTING DATA AND USER EQUIPMENT

This application is the U.S. national phase application based on International Application No. PCT/CN2019/081949, filed Apr. 9, 2019, the content of which is incorporated herein by reference for all purposes.

TECHNICAL FIELD

The disclosure relates to a field of communication technologies, and more particularly to a method and apparatus for sending feedback information to a user equipment using a control channel, a method for transmitting data and an apparatus for transmitting data, a base station, a user equipment and a computer readable storage medium.

BACKGROUND

New Internet applications, such as a new generation of augmented reality (AR), virtual reality (VR) and vehicle-to-vehicle communication, place a high demand on wireless communication technologies, driving the wireless communication technologies to evolve continuously to meet these demands. Presently, cellular mobile communication technologies are in an evolution stage of next generation technologies, and one of the important features of the next generation technologies is to support flexible configuration of multiple service types. Different service types have different requirements for the wireless communication technologies. For example, a main requirement of a service type of eMBB (enhanced mobile broad band) focuses on a large bandwidth and a high speed and the like, and a main requirement of a service type of URLLC (ultra reliable low latency communication) focuses on a high reliability and a low delay, while a main requirement of a service type of mMTC (massive machine type communication) focuses on a large number of connections. Therefore, a next generation of wireless communication systems requires flexible and configurable design to support transmission of the multiple service types.

SUMMARY

According to a first aspect of embodiments of the disclosure, there is provided a method for feeding back data, performed by a base station. The method includes: configuring a control channel for a user equipment (UE), in which the control channel is configured to bear feedback information of physical uplink shared channel (PUSCH) data, the PUSCH data is sent by the UE; and sending the feedback information to the UE via the control channel.

According to a second aspect according to embodiments of the disclosure, there is provided a method for transmitting data, performed by a user equipment (UE). The method includes: receiving feedback information of physical uplink shared channel (PUSCH) data sent by a base station via a control channel; and determining whether to retransmit the PUSCH data based on the feedback information.

According to a third aspect according to embodiments of the disclosure, there is provided an apparatus for transmitting data, performed by a user equipment (UE). The apparatus also includes: a first receiving module and a determining transmitting module. The first receiving module is configured to receive feedback information of physical uplink shared channel (PUSCH) data sent by a base station via a control channel. The determining transmitting module is configured to determine whether to retransmit the PUSCH data based on the feedback information received by the first receiving module.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the disclosure as described in the appended claims.

Figure 1:
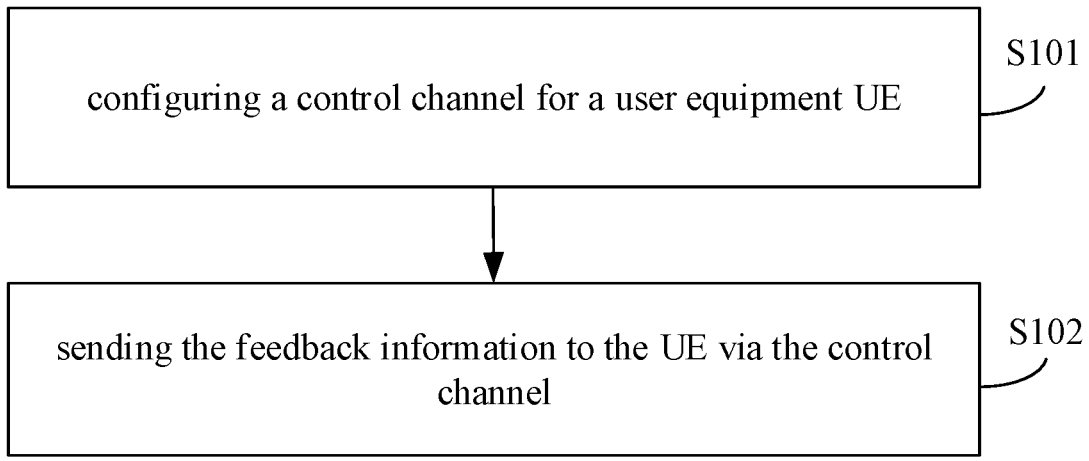
FIG. 1 is a flow chart illustrating a method for feeding back data according to an exemplary embodiment.

FIG. 1 is a flow chart illustrating a method for feeding back data according to an exemplary embodiment. Descriptions are made regarding embodiments of a base station side. As illustrated in FIG. 1, the method for feeding back data includes the following blocks.

At block S101, a control channel is configured for a user equipment (UE). The control channel is configured to bear feedback information of physical uplink shared channel (PUSCH) data, and the PUSCH data is sent by the UE.

Configuring the control channel for the UE may include, but be not limited to, the following ways.

101-1) A time-frequency resource position and a time-frequency resource effective time corresponding to the control channel are configured for the UE.

The base station may configure the time-frequency resource position and the time-frequency resource effective time corresponding to the control channel for the UE when establishing a URLLC service.

In this embodiment, the time-frequency resource effective time may be that N time slots, sub-frames or frames since a start of a time slot for sending the PUSCH data have the above configuration information. The time-frequency resource effective time may also be null. In a case that the time-frequency resource effective time is null, the configuration information exists until new configuration information is received. N may be 0 or 1, etc.

In this embodiment, after configuring the time-frequency resource position and time-frequency resource effective time corresponding to the control channel for the UE, the method may further include sending the time-frequency resource position and the time-frequency resource effective time to the UE via a radio resource control (RRC) signaling.

101-2) The base station agrees with the UE on configuring the control channel at a fixed time-frequency resource position.

In some embodiments, the base station may agree with the UE on configuring the control channel on first k subcarriers of first X*(subcarrier spacing/15K) symbols every 1 ms, or the base station agrees with the UE on configuring the control channel on first k subcarriers of middle X*(subcarrier spacing/15K) symbols every 1 ms.

X may be 15, 30, 60, 120 or 240, and k may be 12, 24 or 36.

101-3) The control channel is configured by scheduling a physical downlink control channel (PDCCH) of the PDSCH data.

In this embodiment, the UE is configured with the control channel for bearing the feedback information of the PUSCH data, such that the feedback information may be sent to the UE via the control channel in the further, which may provide a basis for whether the UE retransmits the PUSCH data based on the feedback information.

At block S102, the feedback information is sent to the UE via the control channel.

In this embodiment, after receiving the PUSCH data sent by the UE, the base station sends a negative acknowledgement (NACK) feedback message to the UE via the control channel in a case that the PUSCH data of the UE is not received on a designated resource or that cyclic redundancy check (CRC) of the received PUSCH data is wrong, and the base station sends an acknowledgement (ACK) feedback message to the UE via the control channel in a case that the PUSCH data of the UE is received on the designated resource.

In the above embodiments, with configuring the control channel for the UE and sending the feedback information to the UE via the control channel, the UE may quickly determine whether to retransmit the PUSCH data based on the feedback information, so as to complete the data transmission within a specified period, while ensuring the data transmission quality, to meet a requirement for transmission delay of services.

Figure 2:
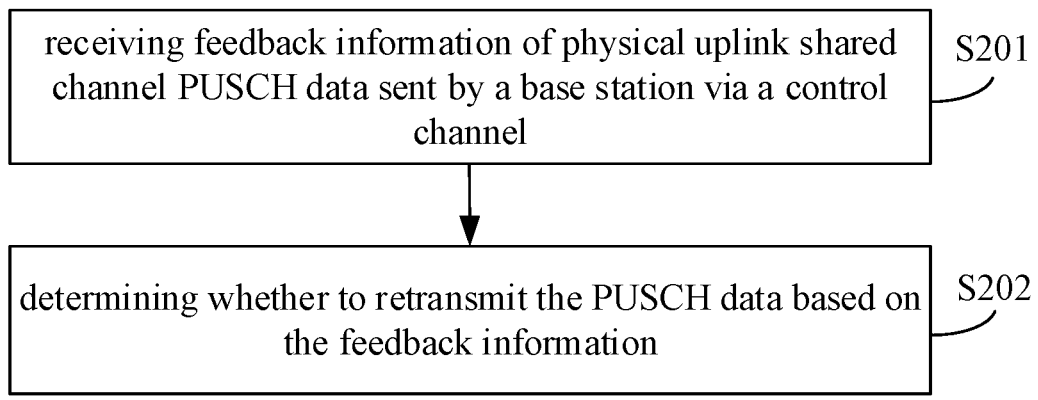
FIG. 2 is a flow chart illustrating a method for feeding back data according to an exemplary embodiment.

FIG. 2 is a flow chart illustrating a method for transmitting data according to an exemplary embodiment. Descriptions are made regarding embodiments of a UE side. As illustrated in FIG. 2, the method for transmitting data includes the following blocks.

At block S201, feedback information of physical uplink shared channel (PUSCH) data sent by a base station via a control channel is received.

In a possible implementation, the method may also include: receiving a time-frequency resource position and a time-frequency resource effective time of the control channel sent by the base station. The UE may obtain the feedback information from the control channel through analysis based on the time-frequency resource position and the time-frequency resource effective time.

In another possible implementation, the method may also include: agreeing with the base station on configuring the control channel at a fixed time-frequency resource position. In this way, the UE may obtain the feedback information through analysis at the fixed time-frequency resource position.

In another possible implementation, the method may also include: obtaining configuration information of the control channel from a physical downlink control channel (PDCCH) for scheduling and transmitting the PDSCH data. In this way, the UE may obtain the feedback information from the control channel through analysis based on the configuration information.

At block S202, it is determined whether the PUSCH data is retransmitted based on the feedback information.

Determining whether to retransmit the PUSCH data based on the feedback information may include following three conditions.

Condition 1) The PUSCH data to be transmitted is sent in a case that the received feedback information is first feedback information and the PUSCH data to be transmitted exists.

Condition 2) The PUSCH data is not retransmitted in a case that the received feedback information is the first feedback information and no PUSCH data to be transmitted exists.

Condition 3) The PUSCH data is retransmitted in a case that the received feedback information is second feedback information.

The PUSCH data may be retransmitted in various ways. For example, the PUSCH data may be retransmitted in following ways.

Way 201-1) Downlink control information (DCI) in a PDCCH for scheduling and transmitting the PUSCH data is detected to retransmit the PUSCH data.

Way 201-2) the PUSCH data is retransmitted on a pre-agreed physical resource.

The UE and the base station may pre-agree physical resources for retransmitting the PUSCH data.

In the above embodiments, with receiving the feedback information of the PUSCH data sent by the base station via the control channel, and determining whether to retransmit the PUSCH data based on the feedback information, data transmission may be completed within a specified period while quality of the data transmission is ensured, and a requirement for transmission delay of services may be well met.

Figure 3:
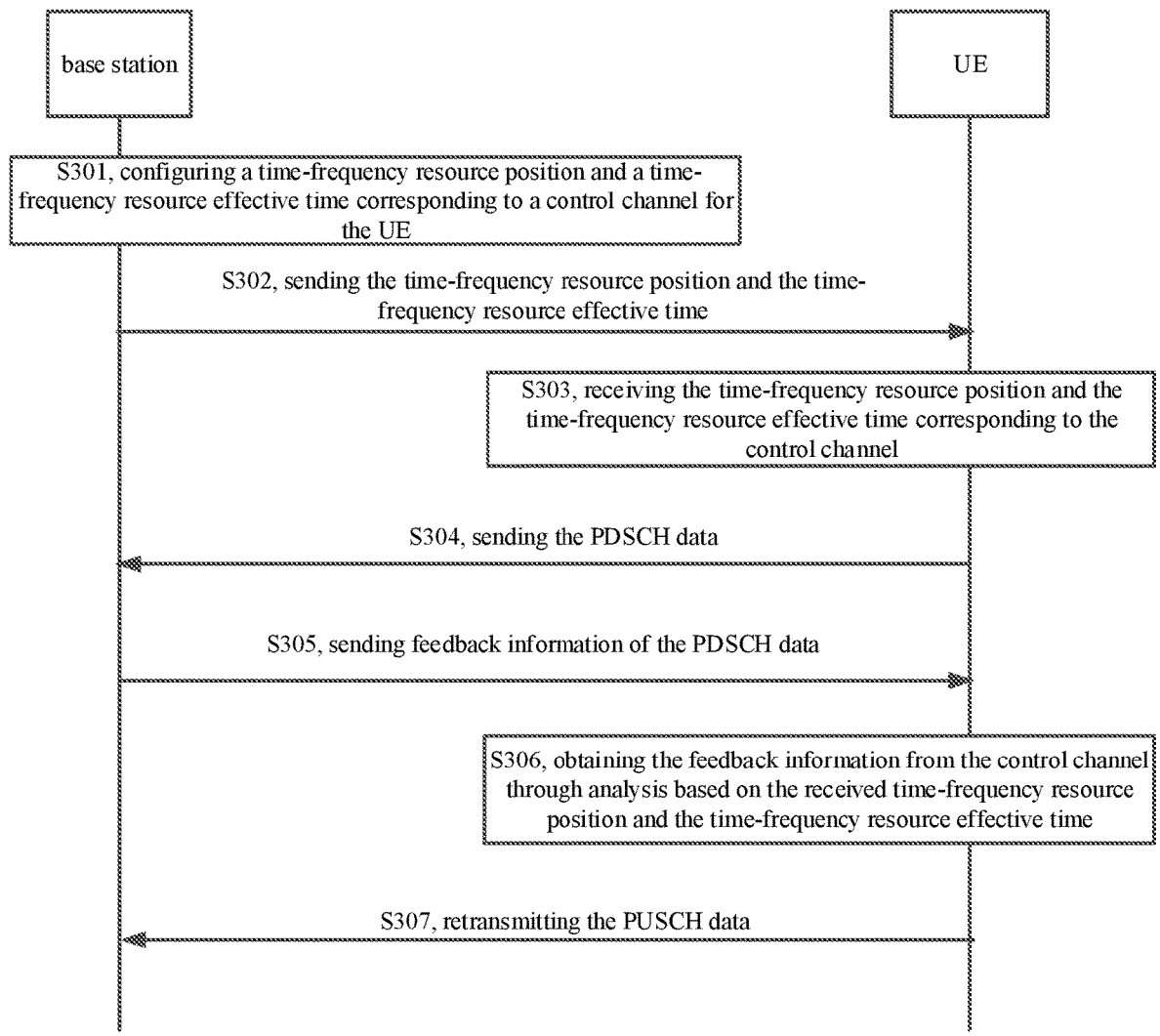
FIG. 3 is a flow chart illustrating signaling of a method feeding back data according to an exemplary embodiment.

FIG. 3 is a flow chart illustrating signaling of a method for feeding back data according to an exemplary embodiment. Descriptions are made regarding embodiments of an interaction between a base station and a UE. As illustrated in FIG. 3, the method includes the following blocks.

At block S301, the base station configures a time-frequency resource position and a time-frequency resource effective time corresponding to a control channel for the UE.

At block S302, the base station sends the time-frequency resource position and the time-frequency resource effective time to the UE via a radio resource control (RRC) signaling.

At block S303, the UE receives the time-frequency resource position and the time-frequency resource effective time corresponding to the control channel.

At block S304, the UE sends PDSCH data to the base station.

At block S305, the base station sends feedback information of the PDSCH data to the UE via the control channel.

At block S306, the UE obtains the feedback information from the control channel through analysis based on the received time-frequency resource position and the time-frequency resource effective time.

At block S307, the PUSCH data is retransmitted in a case that the feedback information received by the UE is NACK feedback information.

In the above embodiment, the interaction between the base station and the UE enables the base station to send the feedback information to the UE via the control channel, such that the UE may quickly determine whether to retransmit the PUSCH data based on the feedback information. Therefore, data transmission is completed within a specified period while ensuring quality of the data transmission to meet a requirement for transmission delay of services.

Figure 4:
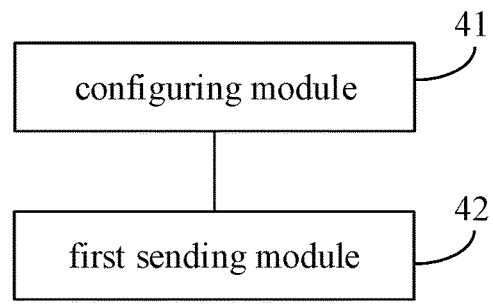
FIG. 4 is a block diagram illustrating an apparatus for feeding back data according to an exemplary embodiment.

FIG. 4 is a block diagram illustrating an apparatus for feeding back data according to an exemplary embodiment. The apparatus for feeding back data is may be provided in a base station. As illustrated in FIG. 4, the apparatus includes a configuring module 41 and a first sending module 42.

The configuring module 41 is configured to configure a control channel for a user equipment (UE). The control channel is configured to bear feedback information of physical uplink shared channel (PUSCH) data sent by the UE.

Figure 5:
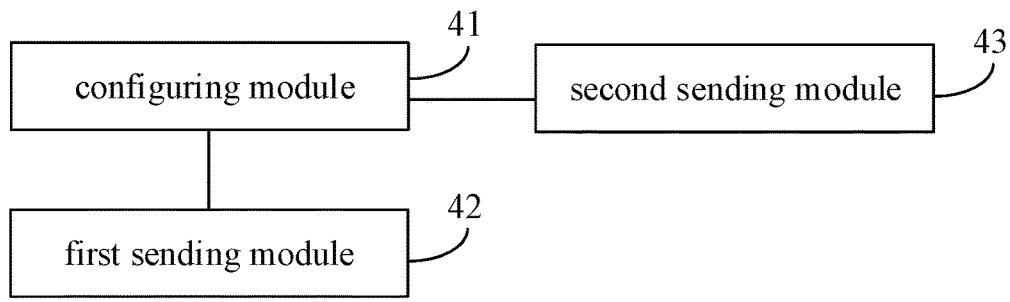
FIG. 5 is a block diagram illustrating an apparatus for feeding back data according to another exemplary embodiment.

As illustrated in FIG. 5, the configuring module 41 is configured to: configure a time-frequency resource position and a time-frequency resource effective time corresponding to the control channel for the UE. The apparatus also includes: a second sending module 43, configured to send the time-frequency resource position and the time-frequency resource effective time to the UE via a radio resource control (RRC) signaling.

In this embodiment, the time-frequency resource effective time may be that N time slots, sub-frames or frames since a start of a time slot for sending the PUSCH data have the above configuration information. The time-frequency resource effective time may also be null. In a case that the time-frequency resource effective time is null, the configuration information exists until new configuration information is received. N may be 0 or 1, etc.

In some embodiments, the configuring module 41 may configured to agree with the UE on configuring the control channel at a fixed time-frequency resource position.

In some embodiments, the base station may agree with the UE on configuring the control channel on first k subcarriers of first X*(subcarrier spacing/15K) symbols every 1 ms, or the base station agrees with the UE on configuring the control channel on first k subcarriers of middle X*(subcarrier spacing/15K) symbols every 1 ms.

X may be 15, 30, 60, 120 or 240, and k may be 12, 24 or 36.

In some embodiments, the configuring module 41 is configured to configure the control channel by scheduling a physical downlink control channel (PDCCH) of the PDSCH data.

In this embodiment, the control channel is configured for the UE in various ways, and implementation means are flexible and diverse.

The first sending module 42 is configured to send the feedback information to the UE via the control channel configured by the configuring module 41.

In this embodiment, after receiving the PUSCH data sent by the UE, the base station sends a negative acknowledgement (NACK) feedback message to the UE via the control channel in a case that the PUSCH data of the UE is not received on a designated resource or that cyclic redundancy check (CRC) of the received PUSCH data is wrong, and the base station sends an acknowledgement (ACK) feedback message to the UE via the control channel in a case that the PUSCH data of the UE is received on the designated resource.

In the above embodiments, with configuring the control channel for the UE and sending the feedback information to the UE via the control channel, the UE may quickly determine whether to retransmit the PUSCH data based on the feedback information, so as to complete the data transmission within a specified period while ensuring the data transmission quality, to meet a requirement for transmission delay of services.

Figure 6A:
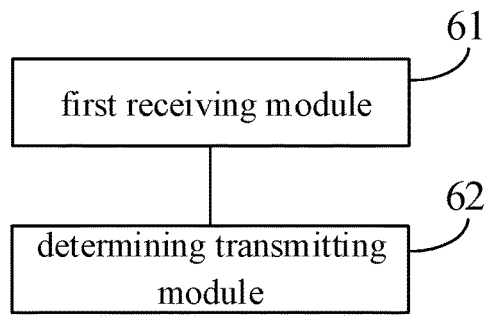
FIG. 6A is a block diagram illustrating an apparatus for transmitting data according to an exemplary embodiment.

FIG. 6A is a block diagram illustrating an apparatus for transmitting data according to an exemplary embodiment. The apparatus for transmitting data is provided in a UE. As illustrated in FIG. 6A, the apparatus for transmitting data includes a first receiving module 61, and a determining transmitting module 62.

The first receiving module 61 is configured to receive feedback information of physical uplink shared channel (PUSCH) data sent by a base station via a control channel.

The determining transmitting module 62 is configured to determine whether to retransmit the PUSCH data based on the feedback information received by the first receiving module.

Figure 6B:
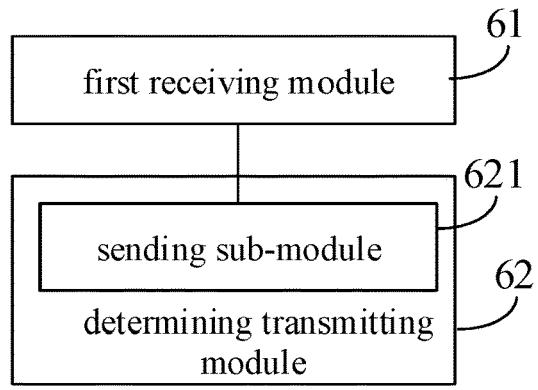
FIG. 6B is a block diagram illustrating an apparatus for transmitting data according to another exemplary embodiment.

In a possible implementation, as illustrated in FIG. 6B, the determining transmitting module 62 may include a sending sub-module 621, configured to send PUSCH data to be transmitted in a case that the feedback information received by the first receiving module 61 is first feedback information and the PUSCH data to be transmitted exists.

Figure 6C:
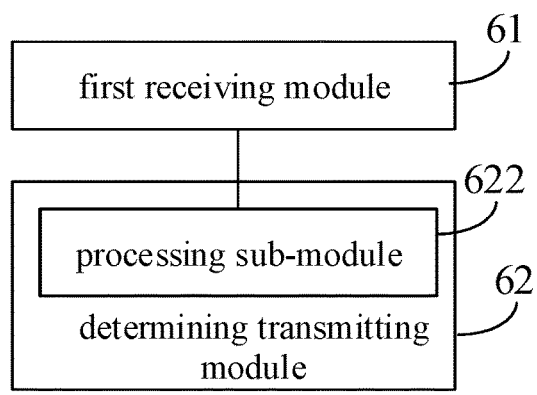
FIG. 6C is a block diagram illustrating an apparatus for transmitting data according to another exemplary embodiment.

In another possible implementation, as illustrated in FIG. 6C, the determining transmitting module 62 may include a processing sub-module 622, configured to not retransmit the PUSCH data in a case that the feedback information received by the first receiving module 61 is first feedback information and no PUSCH data to be transmitted exists.

Figure 6D:
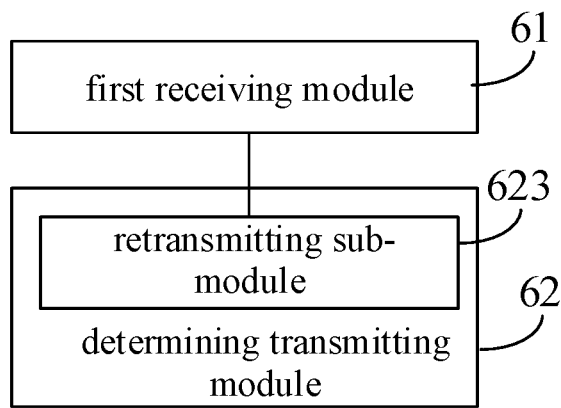
FIG. 6D is a block diagram illustrating an apparatus for transmitting data according to another exemplary embodiment.

In another possible implementation, as illustrated in FIG. 6D, the determining transmitting module 62 may include a retransmitting sub-module 623, configured to retransmit the PUSCH data in a case that the feedback information received by the first receiving module 61 is second feedback information.

In the above embodiments, by receiving the feedback information of the PUSCH data sent by the base station via the control channel, and determining whether to retransmit the PUSCH data based on the feedback information, the data transmission may be completed within the specified period while quality of the data transmission is ensured, and a requirement for transmission delay of services may be well met.

Figure 7:
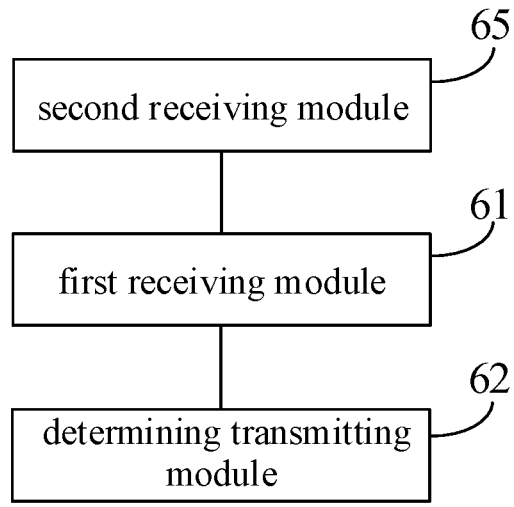
FIG. 7 is a block diagram illustrating an apparatus for transmitting data according to another exemplary embodiment.

FIG. 7 is a block diagram illustrating an apparatus for transmitting data according to another exemplary embodiment. As illustrated in FIG. 7, on the basis of the embodiments illustrated in FIG. 6A, the apparatus for transmitting data may also include a second receiving module 65, configure to receive a time-frequency resource position and a time-frequency resource effective time of the control channel sent by the base station.

The first receiving module 61 is configured to obtain the feedback information from the control channel through analysis based on the time-frequency resource position and the time-frequency resource effective time received by the second receiving module 65.

In the above embodiment, by receiving the time-frequency resource position and the time-frequency resource effective time of the control channel sent by the base station and obtaining the feedback information from the control channel through analysis based on the time-frequency resource position and the time-frequency resource effective time, it is implemented that the feedback information sent by the base station is received, thereby providing a basis for whether to retransmit PUSCH data quickly in the further.

Figure 8:
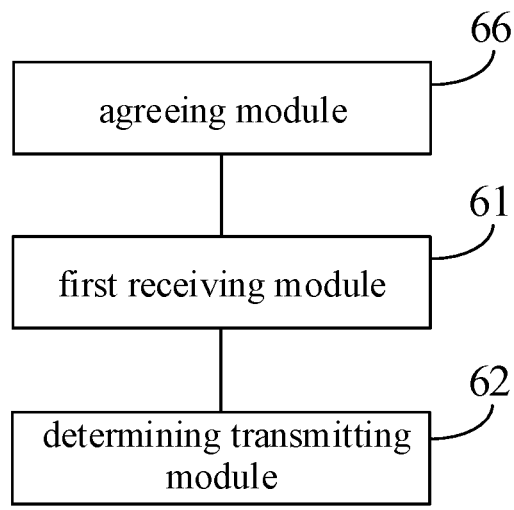
FIG. 8 is a block diagram illustrating an apparatus for transmitting data according to another exemplary embodiment.

FIG. 8 is a block diagram illustrating an apparatus for transmitting data according to another exemplary embodiment. As illustrated in FIG. 8, on the basis of the embodiment illustrated in FIG. 6A, the apparatus for transmitting data may also include an agreeing module 66, configured to agree with the base station on configuring the control channel at a fixed time-frequency resource position.

The first receiving module 61 is configured to obtain the feedback information through analysis at the fixed time-frequency resource position configured by the agreeing module 66.

In the above embodiment, by agreeing with the base station on configuring the control channel at a fixed time-frequency resource position, and obtaining the feedback information through analysis at the fixed time-frequency resource position configured by the agreeing module, it is implemented that the feedback information sent by the base station is received, thereby providing a basis for whether to retransmit the PUSCH data quickly in the further.

Figure 9:
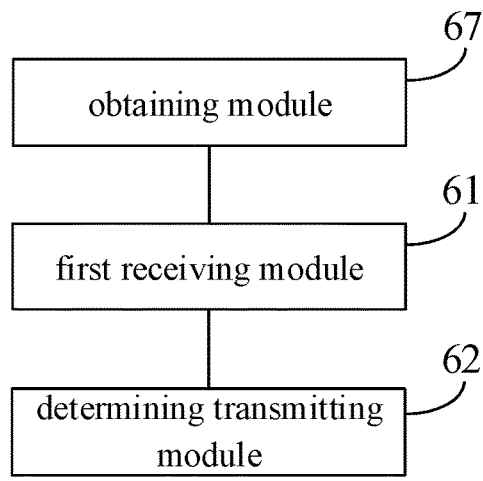
FIG. 9 is a block diagram illustrating an apparatus for transmitting data according to another exemplary embodiment.

FIG. 9 is a block diagram illustrating an apparatus for transmitting data according to another exemplary embodiment. As illustrated in FIG. 9, on the basis of the above embodiment illustrated in FIG. 6A, the apparatus for transmitting data may also include an obtaining module 67, configured to obtain configuration information of the control channel from a physical downlink control channel (PDCCH) for scheduling and transmitting the PDSCH data.

The first receiving module 61 is configured to obtain the feedback information from the control channel through analysis based on the configuration information obtained by the obtaining module 67.

In the above embodiment, by obtaining the configuration information of the control channel from the physical downlink control channel (PDCCH) for scheduling and transmitting the PDSCH data and obtaining the feedback information from the control channel through analysis based on the configuration information obtained by the obtaining module, it is implemented that the feedback information sent by the base station is received, thereby providing a basis for whether to retransmit the PUSCH data quickly in the further.

Figure 10:
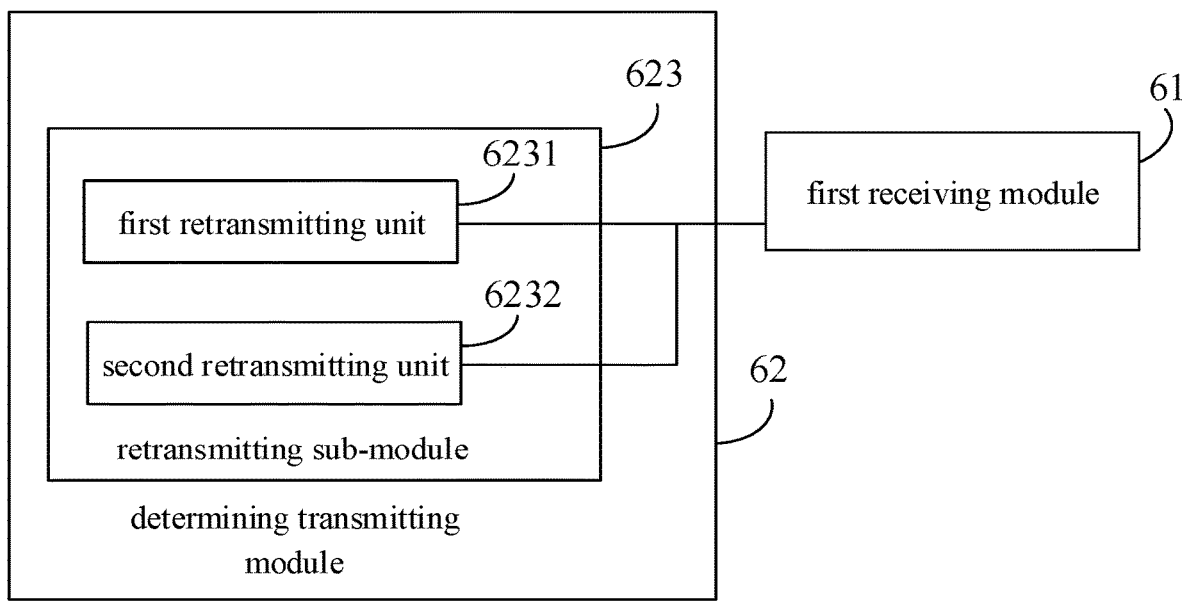
FIG. 10 is a block diagram illustrating an apparatus for transmitting data according to another exemplary embodiment.

FIG. 10 is a block diagram illustrating an apparatus for transmitting data according to another exemplary embodiment. As illustrated in FIG. 10, on the basis of the above embodiment illustrated in FIG. 6D, the retransmitting sub-module 623 includes: a first retransmitting unit 6231, and a second retransmitting unit 6232.

The first retransmitting unit 6231 is configured to detect downlink control information (DCI) in a PDCCH for scheduling and transmitting the PUSCH data to retransmit the PUSCH data.

The second retransmitting unit 6232 is configured to retransmit the PUSCH data on a pre-agreed physical resource.

In the above embodiments, the PUSCH data is retransmitted in various ways, and the implementation means are flexible and diverse.

Figure 11:
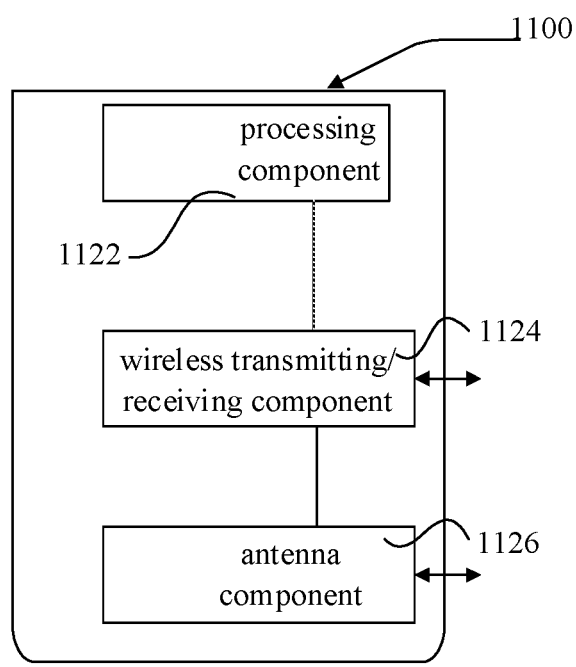
FIG. 11 is a block diagram illustrating a device performed by an apparatus for feeding back data according to an exemplary embodiment.

FIG. 11 is a block diagram illustrating a device performed by an apparatus for feeding back data according to an exemplary embodiment.

The device 1100 may be provided as a base station. Referring to FIG. 11, the device 1100 includes a processing component 1122, a wireless transmitting/receiving component 1124, an antenna component 1126, and a signal processing part specific to a wireless interface. The processing component 1122 may further include one or more processors.

A processor in the processing component 1122 is configured to configure a control channel for a user equipment (UE), in which the control channel is configured to bear feedback information of physical uplink shared channel (PUSCH) data sent by the UE; send the feedback information to the UE via the control channel.

In an exemplary embodiment, a non-transitory computer-readable storage medium including instructions is also provided. The instructions may be executed by the processing component 1122 of the device 1100 to implement the data feedback method described above. For example, the non-transitory computer-readable storage medium may be a ROM (read only memory), a random access memory (RAM), a CD-ROM (compact disc-ROM), a magnetic tape, a floppy disk and an optical data storage device.

Figure 12:
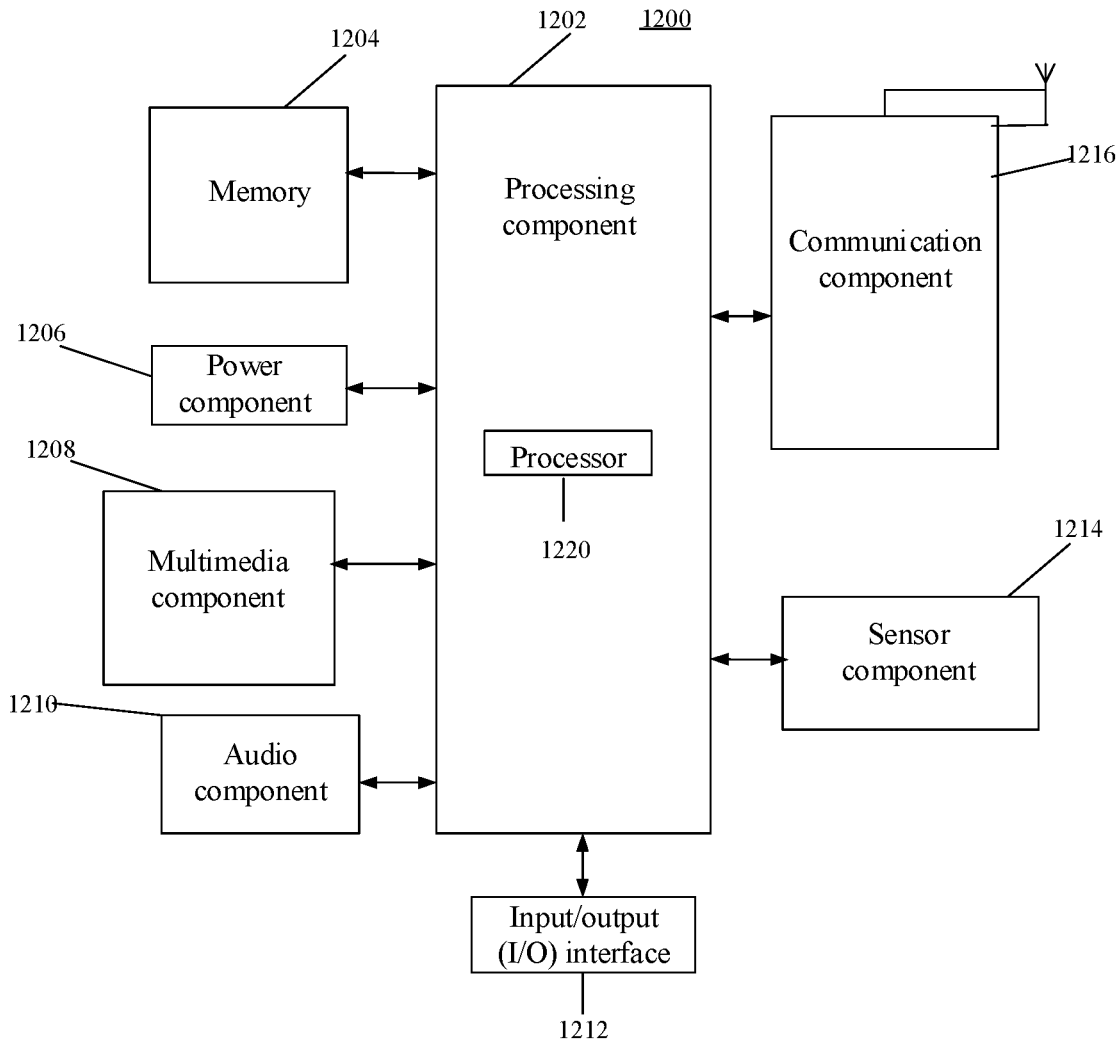
FIG. 12 is a block diagram illustrating a device performed by an apparatus for transmitting data according to another exemplary embodiment.

FIG. 12 is a block diagram illustrating a device performed by an apparatus for transmitting data according to another exemplary embodiment. For example, the device 1200 may be a user equipment such as a mobile phone, a computer, a digital broadcasting terminal, a message transceiving equipment, a game console, a tablet equipment, a medical equipment, a fitness equipment, or a personal digital assistant.

As illustrated in FIG. 12, the device 1200 may include one or more of: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1202 for executing instructions to implement all or a part of the above method. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

A processor 1220 in the processing component 1202 may be configured to: receive feedback information of physical uplink shared channel (PUSCH) data sent by a base station via a control channel; and determine whether to retransmit the PUSCH data based on the feedback information.

The memory 1204 is configured to store various types of data to support the operation of the device 1200. Examples of such data include instructions for any application or method operated on the device 1200 for performing contraction data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 1206 is configured to provide power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1208 includes a front camera and/or a rear camera. When the device 1200 is in an operation mode, such as a shooting mode or a video mode, the front camera and/or the rear camera may receive external multimedia data. Each front camera and rear camera may be a fixed optical lens system or have a focal length and an optical zoom capability.

The audio component 1210 is configured to output and/or input an audio signal. For example, the audio component 1210 includes a microphone ("MIC") for receiving an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker for outputting the audio signal.

The I/O interface 1212 is configured to provide an interface between the processing component 1202 and peripheral interface modules, such as a keyboard, a click wheel, buttons, and the like. These buttons may include, but be not limited to, a home button, a volume button, a start button, and a lock button.

The sensor component 1214 includes one or more sensors for providing status assessments of various aspects of the device 1200. For example, the sensor component 1214 may detect an open/closed state of the device 1200, relative positioning of components, e.g., the display and the keypad of the device 1200, a position change of the device 1200 or a component of the device 1200, a presence or absence of user contraction with the device 1200, an orientation or an acceleration/deceleration of the device 1200, and a temperature change of the device 1200. The sensor component 1214 1214 may include a proximity sensor configured to detect the presence of nearby objects without any physical contact. The sensor component 1214 may also include an optical sensor, such as a CMOS or CCD image sensor, for use in an imaging application. In some embodiments, the sensor component 1214 may also include an acceleration sensor, a gyro sensor, a magnetic sensor, a pressure sensor or a temperature sensor.

The communication component 1216 is configured to facilitate communication, wired or wirelessly, between the device 1200 and other devices. The device 1200 may access a wireless network based on a communication standard, such as Wi-Fi, 3Q or a combination thereof. In an exemplary embodiment, the communication component 1216 receives a broadcast signal or broadcast associated information from an external broadcast management system via a broadcast channel. In an exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In exemplary embodiments, there is also provided a non-transitory computer readable storage medium including instructions, such as the memory 1204 including the instructions. The instructions may be executed by the processor 1220 in the device 1200 for performing the above method. For example, the non-transitory computer readable storage medium may be a ROM, a RAM, a CD-ROM, a magnetic tape, a floppy disc, an optical data storage device, and the like.

As for the apparatus embodiments, the apparatus embodiments basically correspond to the method embodiments, so please refer to partial description of the method embodiments for relevant points. The apparatus embodiments described above are only exemplary. The units described as separated components may or may not be physically separated. The components displayed as units may or may not be physical units, that is, the components may be located in a place or distributed to multiple network units. Some or all of the modules may be selected based on an actual need to achieve the purpose of embodiments. The skilled in this field may understand and implement the embodiments without creative labor.

It should be noted that, in the specification, relational terms such as "first" and "second" are only used to distinguish an entity or operation from another entity or operation, and do not necessarily require or imply any such actual relationship or order between these entities or operations. The terms "comprising", "including" or any other variation thereof are intended to cover non-exclusive inclusion, such that a process, method, article or equipment including a series of elements includes not only those elements, but also other elements not explicitly listed, or elements inherent to such process, method, article or equipment. Without further limitation, the element defined by the sentence "including one . . . " does not exclude that there are other identical elements in the process, method, article or equipment including the element.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only be limited by the appended claims.

What is claimed is:

1. A method for feeding back data, performed by a base station, and comprising:
    configuring a control channel for a user equipment (UE), wherein the control channel is configured to bear feedback information of physical uplink shared channel (PUSCH) data, the PUSCH data is sent by the UE; and
    sending the feedback information to the UE via the control channel;
    wherein configuring the control channel for the UE comprises:
    agreeing with the UE on configuring the control channel at a fixed time-frequency resource position;
    wherein, the control channel is configured on first k subcarriers of first X*(subcarrier spacing/15K) symbols every 1 ms, X is 15, 30, 60, 120 or 240, and k is 12, 24 or 36; the feedback information is configured for the UE to determine whether to retransmit the PUSCH data, the PUSCH data is configured to retransmit on a pre-agreed physical resource in response to determining to retransmit the PUSCH data.

2. A method for transmitting data, performed by a user equipment (UE), and comprising:
    receiving feedback information of physical uplink shared channel (PUSCH) data sent by a base station via a control channel; and
    determining whether to retransmit the PUSCH data based on the feedback information;
    the method comprises:
    agreeing with the base station on configuring the control channel at a fixed time-frequency resource position;
    wherein, the control channel is configured on first k subcarriers of first X*(subcarrier spacing/15K) symbols every 1 ms, X is 15, 30, 60, 120 or 240, and k is 12, 24 or 36;
    wherein the PUSCH data is configured to retransmit on a pre-agreed physical resource in response to determining to retransmit the PUSCH data.

3. The method of claim 2, wherein determining whether to retransmit the PUSCH data based on the feedback information comprises:
    sending PUSCH data to be transmitted in a case that the received feedback information is first feedback information and the PUSCH data to be transmitted exists.

4. The method of claim 2, wherein determining whether to retransmit the PUSCH data based on the feedback information comprises:
    not retransmitting the PUSCH data in a case that the received feedback information is first feedback information and no PUSCH data to be transmitted exists.

5. The method of claim 2, wherein determining whether to retransmit the PUSCH data based on the feedback information comprises:
    retransmitting the PUSCH data in a case that the received feedback information is second feedback information.

6. The method of claim 5, wherein retransmitting the PUSCH data comprises:
    detecting downlink control information (DCI) in a PDCCH for scheduling and transmitting the PUSCH data to retransmit the PUSCH data; or
    retransmitting the PUSCH data on a pre-agreed physical resource.

7. A user equipment, comprising:
    a processor; and
    a memory, configured to store instructions executable by the processor,
    wherein the processor is configured to:
    receive feedback information of physical uplink shared channel (PUSCH) data sent by a base station via a control channel; and
    determine whether to retransmit the PUSCH data based on the feedback information;
    wherein the processor is further configured to agree with the base station on configuring the control channel at a fixed time-frequency resource position;
    the control channel is configured on first k subcarriers of first X*(subcarrier spacing/15K) symbols every 1 ms, X is 15, 30, 60, 120 or 240, and k is 12, 24 or 36;
    the PUSCH data is configured to retransmit on a pre-agreed physical resource in response to determining to retransmit the PUSCH data.

8. The user equipment of claim 7, wherein the processor is configured to:
    send PUSCH data to be transmitted in a case that the received feedback information is first feedback information and the PUSCH data to be transmitted exists.

9. The user equipment of claim 7, wherein the processor is configured to:
    not retransmit the PUSCH data in a case that the received feedback information is first feedback information and no PUSCH data to be transmitted exists.

10. The user equipment of claim 7, wherein the processor is configured to:
    retransmit the PUSCH data in a case that the received feedback information is second feedback information.

11. A base station, comprising:
    a processor; and
    a memory, configured to store instructions executable by the processor,
    to perform the method of claim 1.

* * * * *